(12) United States Patent
Fuente et al.

(10) Patent No.: US 7,865,486 B2
(45) Date of Patent: *Jan. 4, 2011

(54) PROVIDING STORAGE CONTROL IN A NETWORK OF STORAGE CONTROLLERS

(75) Inventors: Carlos Francisco Fuente, Portsmouth (GB); William James Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/104,190

(22) Filed: Apr. 16, 2008

(65) Prior Publication Data

US 2008/0215838 A1 Sep. 4, 2008

Related U.S. Application Data

(63) Continuation of application No. 10/447,351, filed on May 29, 2003, now Pat. No. 7,401,081.

(30) Foreign Application Priority Data

Nov. 28, 2002 (GB) .................................. 0227735.8

(51) Int. Cl.
G06F 7/00 (2006.01)
G06F 17/00 (2006.01)
(52) U.S. Cl. ..................... 707/704; 707/812; 711/152
(58) Field of Classification Search .......... 707/999.008, 707/999.201
See application file for complete search history.

(56) References Cited

U.S. PATENT DOCUMENTS

| | | | |
|---|---|---|---|
| 5,913,213 A * | 6/1999 | Wikstrom et al. ........... 707/610 |
| 6,032,216 A * | 2/2000 | Schmuck et al. ............ 710/200 |
| 6,061,770 A * | 5/2000 | Franklin ..................... 711/162 |
| 6,282,610 B1 * | 8/2001 | Bergsten ..................... 711/114 |
| 6,345,368 B1 * | 2/2002 | Bergsten ..................... 714/11 |
| 6,389,420 B1 * | 5/2002 | Vahalia et al. ..................... 1/1 |
| 6,453,354 B1 * | 9/2002 | Jiang et al. .................. 709/229 |
| 6,466,978 B1 * | 10/2002 | Mukherjee et al. .......... 709/225 |
| 6,636,878 B1 * | 10/2003 | Rudoff .............................. 1/1 |
| 6,795,850 B2 * | 9/2004 | Wu et al. ..................... 709/213 |
| 6,996,741 B1 * | 2/2006 | Pittelkow et al. ............... 714/5 |
| 7,003,688 B1 * | 2/2006 | Pittelkow et al. ............... 714/7 |
| 7,010,553 B2 * | 3/2006 | Chen et al. ......................... 1/1 |
| 2002/0078048 A1 * | 6/2002 | High et al. ..................... 707/8 |
| 2003/0220943 A1 * | 11/2003 | Curran et al. ............... 707/202 |
| 2004/0088297 A1 * | 5/2004 | Coates et al. ................. 707/10 |
| 2005/0240628 A1 * | 10/2005 | Jiang et al. ............... 707/104.1 |

* cited by examiner

Primary Examiner—Shew-Fen Lin
(74) Attorney, Agent, or Firm—Dillon & Yudell LLP

(57) ABSTRACT

An apparatus for providing storage control in a network of storage controllers is disclosed. The apparatus includes an owner storage controller; an I/O performing component, an ownership assignment component, a lock manager and a messaging component. The ownership assignment component assigns ownership of metadata for data to an owner storage controller. The lock manager controls the locking of metadata during I/O. The messaging component passes messages among storage controllers to request metadata state, to grant locks, to request release of locks, and to signal lock release. The I/O is performed on data whose metadata is owned by an owner storage controller, subject to compliance with metadata lock protocols controlled by the owner storage controller, and any copy of the data held from time to time is maintained in a coherency relation with the data.

4 Claims, 2 Drawing Sheets

PROVIDING STORAGE CONTROL IN A NETWORK OF STORAGE CONTROLLERS

PRIORITY CLAIM

The present patent application is a continuation of U.S. patent application Ser. No. 10/447,351, filed on May 29, 2003, now U.S. Pat. No. 7,401,081 and entitled Method and Apparatus for Providing Storage Control in a Network of Storage Controllers, and also claims priority to Great Britain Application No. 0227735.8, filed on Nov. 28, 2002, both of which are incorporated herein by reference.

BACKGROUND OF THE INVENTION

1. Technical Field

The present invention relates to computer storage controllers in general and in particular to a method for providing shared storage to multiple storage controllers. Still more particularly, the present invention provides multiple storage controllers to participate in advanced storage functions where the ownership and locking at a metadata level can be distributed among any one of the storage controllers.

2. Description of the Related Art

In the field of computer storage systems, there is an increasing demand for the so-called advanced functions. Advanced functions go beyond the simple input/output (I/O) functions of conventional storage systems. Advanced functions depend on the control of the metadata used to retain state information related to the real or user data stored in a computer system. The manipulations available using advanced functions enable various actions to be applied quickly to virtual images of data, while leaving the real data available for use by user applications. One example of such an advanced function is Flash Copy.

The Flash Copy function is sometimes known as the Point-In-Time copy or T0-copy. At the highest level, Flash Copy is a function where a second copy of some data is made available. The second copy's contents are initially identical to that of the first copy. The second copy is made available instantly, which means, in practical terms, that the second copy is made available in much less time than would be required to create a true, separate, physical copy, and that the second copy can be established without any unacceptable disruption to the operations of an application that is using the first copy.

Once established, the second copy can be used for a number of purposes, including backups, system trials and data mining. The first copy continues to be used for its original purpose by its associated application. If backup were to be performed without Flash Copy, the application must be shutdown before the backup can be taken, and then the application will be restarted again. Since it is becoming increasingly difficult to find a time window during which an application is sufficiently idle to be shut down, therefore the cost of performing a backup is relatively high. As such, there is a significant value in the ability of Flash Copy to allow backups to be taken without stopping any on-going application.

Flash Copy achieves the illusion of the existence of a second copy by redirecting read I/O addressed to the second copy (henceforth referred to as "Target") to the original copy (henceforth referred to as "Source"), unless that region has been subject to a write. When a region has been the subject of a write (to either Source or Target), then in order to maintain the illusion that both Source and Target own their own copy of the data, a process is invoked to suspend the operation of the write command, and without it having taken effect, issues a read of the affected region from the Source, applies the read data to the Target with a write, then (and only if all steps were successful) releases the suspended write. Subsequent writes to the same region do not need to be suspended since the Target already has its own copy of the data. Such copy-on-write technique is well-known and is used in many environments.

There are many variations as to how Flash Copy can be implemented. These variations show through in the various features of an implementation. For example, some implementations allow reads and writes to the Target, while others only allow reads. Some implementations allow only limited update to the Target, and some require the Target to be the same size as the Source, while others permit it to be smaller.

However, all implementations rely on some data structure that governs the above decisions, namely, the decision as to whether reads received at the Target are issued to the Source or the Target, and the decision as to whether a write must be suspended to allow the copy-on-write to take place. The data structure essentially tracks the regions that have been copied from the Source to the Target, as distinct from those that have not.

Maintenance of such data structure (hereinafter called metadata) is the key to implementing the algorithm behind Flash Copy. Other advanced functions such as Remote Copy (also known as continuous copy or remote mirroring) or Virtualization rely on similar data structures. The metadata for each of those advanced functions differs, but in all cases, it is used to maintain state information, such as the location of data, the mapping of virtualized files to real storage objects, etc. The metadata is held in a persistent storage.

A function such as Flash Copy is relatively straightforward to implement within a single processor complex, as is often employed within modern storage controllers. With a little extra effort, it is possible to implement fault tolerant Flash Copy, such that two or more processor complexes can have accesses to a copy of the metadata. Thus, in the event of a failure of the first processor complex, the second processor complex can be used to continue operation, without loss of access to the Target Image.

However, the I/O capability of a single processor complex is limited. There is a finite limit as to the capability improvement of a single processor complex, which is measured in terms of either I/Os per second, or bandwidth (in megabyte/second) has a finite limit, and thus a constraint will be imposed on the performance of user application(s) eventually. Such limit arises in many implementations of Flash Copy, but a good example is in storage controllers. A typical storage controller has a single processor complex that dictates a limit on the performance capability of that storage controller.

Additional storage controllers can be installed. But the separate storage controllers do not share access to the metadata, and therefore do not cooperate in managing a Flash Copy image. The storage space becomes fragmented, with functions such as Flash Copy being confined to the scope of a single controller system. Both Source and Target disks must be managed within the same storage controller. A single storage controller disk space may become full, while another has some spare space, but it is not possible to separate the Source and Target disks, placing the Target disk under the control of the new controller. This is particularly unfortunate in the case of a new Flash Copy, where moving the Target is a cheap operation, as it has no physical data associated with it.

As well as constraining the total performance possible for a Source/Target pair, the constraint of single controller storage functions adds complexity to the administration of the storage environment. The administrative cost is often cited as the biggest cost in the total cost of ownership of storage. It would be significantly advantageous to reduce system cost and complexity by removing all possible arbitrary constraints.

A simple method of allowing multiple controllers to participate in a shared Flash Copy relationship is to assign one controller as the Owner of the metadata, and have the other controllers forward all read and write requests to that controller. The owning controller processes the requests as if they come directly from its own attached host servers, using the algorithm described above, and completes each request back to the originating controller. The main drawback of such method is that the burden of forwarding each I/O request is too great, possibly doubling the total system-wide cost, and hence approximately halving the system performance.

It is known in the field of distributed parallel database processing to have a distributed lock management facility that enables resources to be assembled into lock clubs and to assign lock club owners that in turn control all locking for their assigned regions and issue locking control messages to I/O-requesting clients. Such a system is implemented at the logical resource level, and does not allow for control of locks among storage controller systems, nor does it provide any form of lock management at a metadata level. It also introduces considerable overhead in the case of storage virtualization, when real data segments may be held in widely distributed physical media.

It has been suggested in the academic literature, for example, in *Scalable Concurrency Control and Recovery for Shared Storage Arrays*" by Amiri et al., that it is possible to use distributed lock management at the device level in storage controller networks. However, it is known that such lock management techniques are inhibited by the burden of messaging that must take place among the storage controllers, leading to long latency periods and increased potential for deadlocks and repeated retries.

Consequently, it would be desirable to provide a low-cost, high-performance, scalable scheme that allows for multiple storage controllers to participate in advanced storage functions where the ownership and locking at a metadata level can be distributed among any one of the storage controllers.

SUMMARY OF THE INVENTION

In accordance with a preferred embodiment of the present invention, an apparatus for providing storage control in a network of storage controller includes an owner storage controller; an input/output (I/O) performing component, an ownership assignment component, a lock management component, and a messaging component. The ownership assignment component assigns ownership of metadata for data to the owner storage controller. The lock management component, located at the owner storage controller, controls the locking of the metadata during an I/O activity to ensure coherency of the data with any copy of the data held from time to time. The messaging component, also located at the owner storage controller, passes messages among storage controllers to request a metadata state, grants a lock, requests release of a lock, and signals that a lock has been released. The I/O performing component performs I/O on data whose metadata is owned by an owner storage controller, subject to the I/O performing component's compliance with metadata lock protocols controlled by the owner storage controller. A copy of the data held from time to time is maintained in a coherency relation with the data.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention employs messaging to coordinate activities among multiple storage controllers in an n-way memory storage system. Although the messaging coordinates activities among multiple storage controllers, each storage controller is still responsible for performing its own input/output (I/O). The messaging imposes a lower processing burden on the storage controllers in the memory storage system than the I/O forwarding scheme that is typically used in a conventional memory storage system. This is because the protocol messages are smaller in total number of bytes (transferred) than the I/O forwarding scheme. In addition, messages are amenable to coalescing or batching such that system overhead can be further reduced.

Figure 1:
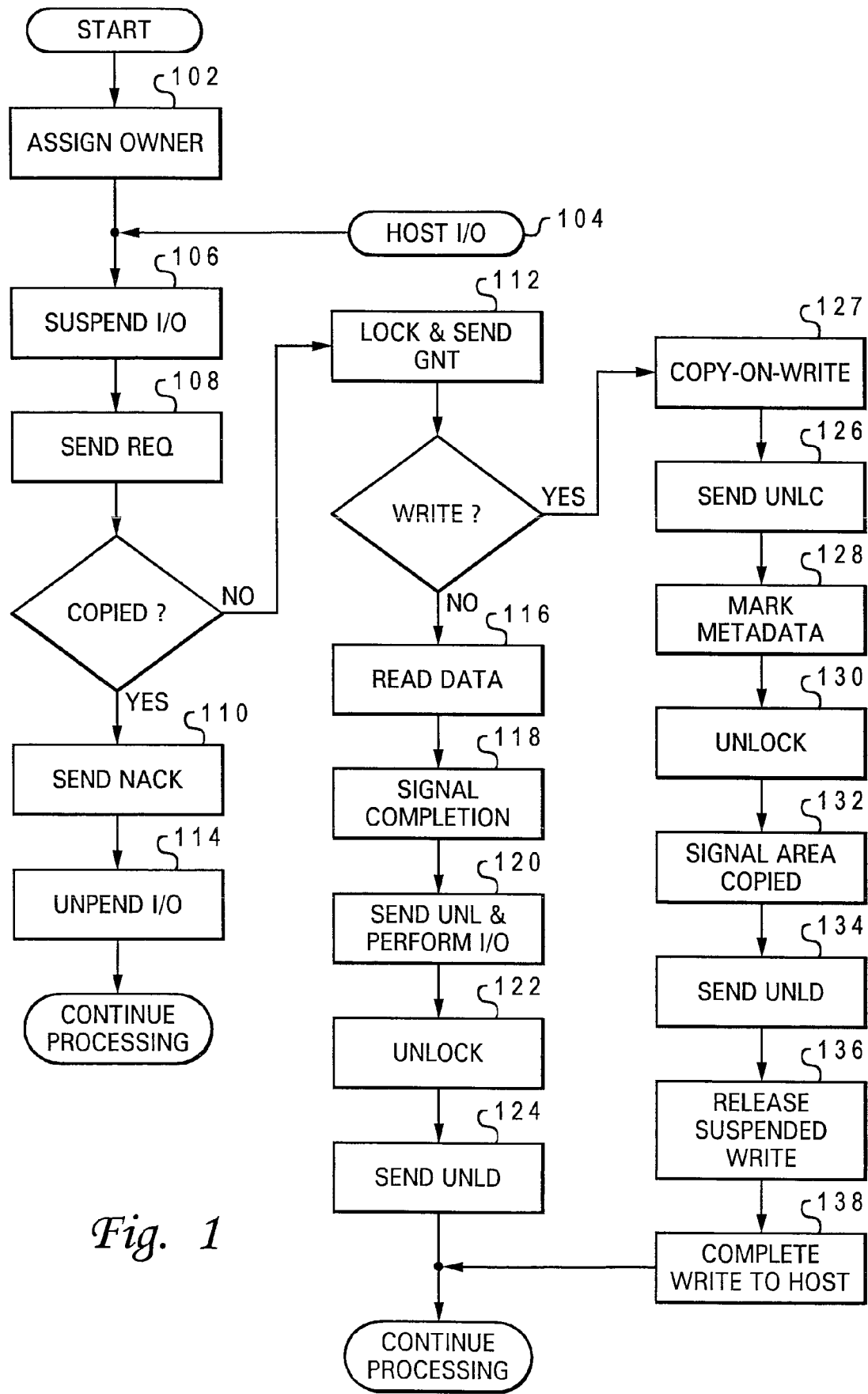
FIG. 1 is a high-level logic flow diagram of a method for providing storage control in a network of storage controllers, in accordance with a preferred embodiment of the present invention.

As an example, consider an n-way memory storage system implementing Flash Copy. Assume every storage controller has access to the memory storage that is managed by the cooperating set of the n storage controllers. Referring now to the drawings and in particular to FIG. 1, there is depicted a high-level logic flow diagram of a method for providing storage control in a network of storage controllers, in accordance with a preferred embodiment of the present invention. One of the storage controllers is designated as an owner of the metadata controlling all I/O relationships of a region of storage, as shown in block 102. The remaining storage controllers are designated as clients. Preferably, one of the client storage controllers is further designated as a backup owner and maintains a copy of the metadata in order to provide continuous availability in the event of a failure of the designated owner storage controller.

A host may send an I/O request to one of the client storage controllers. The I/O request from the host may be either a Read operation from or a Write operation to the Target disk, or a Write operation to the Source disk. In response to the host I/O request arriving at a client storage controller C, as depicted in block 104, client storage controller C begins processing by suspending I/O, as shown in block 106. Client storage controller C then sends a message REQ to an owner storage controller O, as depicted in block 108, asking if the grain has been copied.

On the receipt of the message REQ, owner storage controller O inspects its own metadata structures. If owner storage controller O finds that the region has already been copied, owner storage controller O replies with a NACK message, as shown in block 110. If owner storage controller O finds that the region has not already been copied, owner storage controller O places a lock record against the corresponding metadata for the region within its own metadata structures, and replies with a GNT message to indicate that the lock has been granted, as depicted in block 112. The lock record is required to ensure compatibility between the host I/O request just received and granted, and further requests that may arrive affecting the same metadata while the processing at client storage controller C continues. The lock record is maintained the same way as if the I/O had been received locally by owner storage controller O, and are well-known to those skilled in the art.

On the receipt of a NACK message, client storage controller C unpends the host I/O request, as shown in block 114. On the receipt of the GNT message, client storage controller C continues by performing the data transfer or transfers required by the Flash Copy algorithm, as depicted in block 116. In the case of a Target Read, this means that the Read operation is performed at the source disk. Next, client storage controller C processes the read request until completion, as shown in block 118, and issues an UNL message to owner storage controller O to request that the lock be released, at the same time as completing the host I/O request, as depicted in block 120.

After the receipt of an UNL message, owner storage controller O removes the lock record from its metadata table, as shown in block 122, thus possibly releasing further I/O requests that were suspended because of that lock. Owner storage controller O then sends an UNLD message to client storage controller C, as depicted in block 124, indicating that the lock has been released, and allowing client storage controller C to reuse the resources associated with the host I/O request. However, such is not required by the Flash Copy algorithm itself.

In the case of a write operation to either Target disk or Source disk, a copy-on-write operation must be performed, as shown in block 127. Having completed all steps of the copy-on-write operation, and with the original write I/O request still suspended, client storage controller C issues an UNLC request to owner storage controller O to request that the lock be released and the metadata be updated to record the copy-on-write operation, as depicted in block 126.

On the receipt of the UNLC message, owner storage controller O marks in the metadata the region affected as having been copied, as shown in block 128. Then, owner storage controller O removes the lock record, as depicted in block 130, informs any waiting requests that the area has now been copied, as shown in block 132, and issues an UNLD message to client storage controller C to indicate that the lock has been released, as depicted in block 134.

On the receipt of the UNLD message, client storage controller C releases the suspended write operation, as shown in block 136, which will be completed some time later, and client storage controller C then completes the write operation to the host, as depicted in block 138. Recovery paths are required to cater for the situation where a disk I/O fails, or the messaging system fails, or a storage controller fails, but the requirements and implementations of these are well understood to those ordinarily skilled in the art.

The above description has been cast in terms relating to a single I/O, and a single client storage controller C. But it is understood by one of ordinary skill in the art as to how the scheme continues to operate in the presence of multiple I/Os, from multiple client storage controllers, with owner storage controller O continuing to process all I/O requests using the same algorithm.

Figure 2:
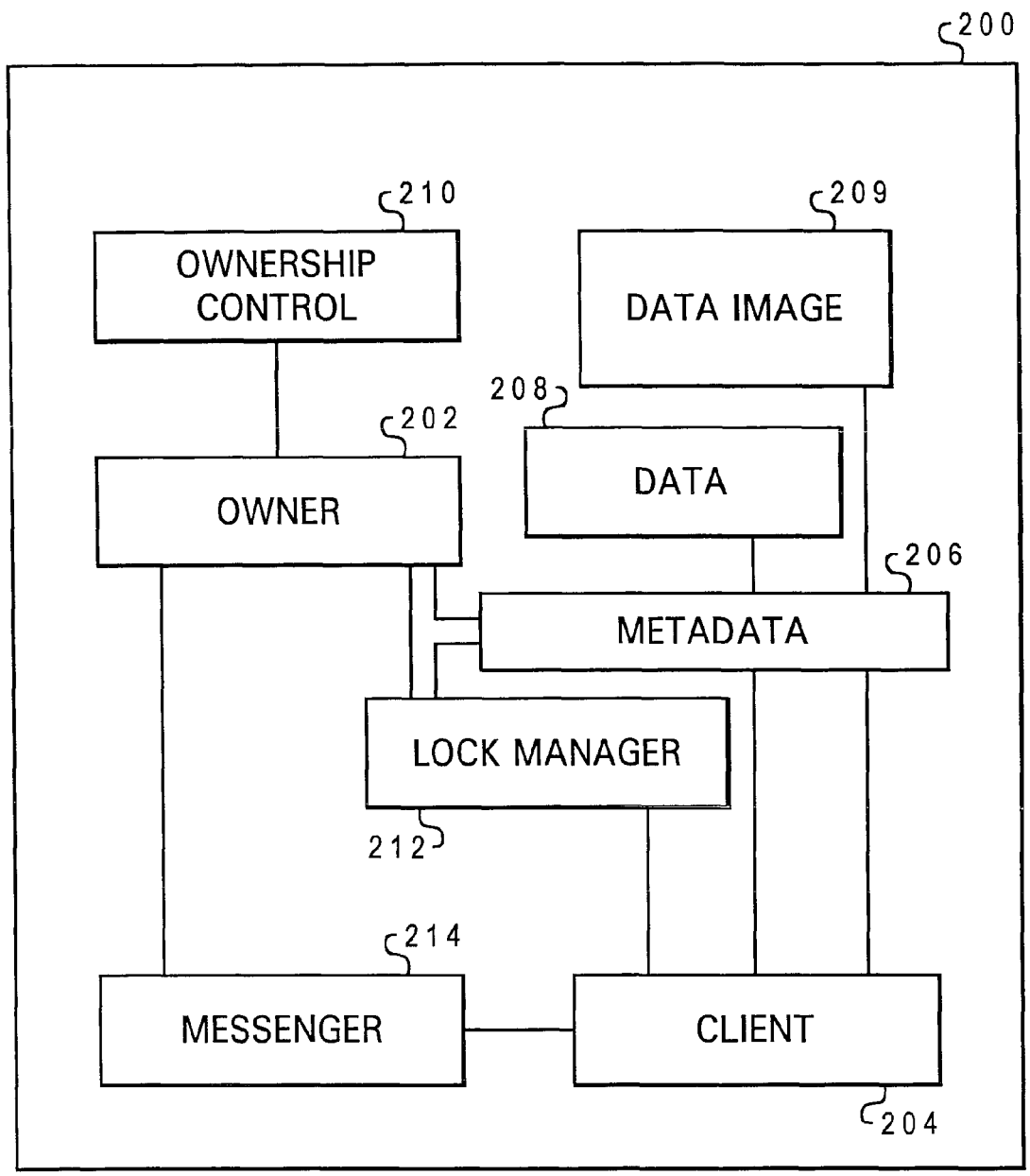
FIG. 2 is a block diagram of an apparatus for providing storage control in a network of storage controllers, in accordance with a preferred embodiment of the present invention.

With reference now to FIG. 2, there is depicted an apparatus for providing storage control in a network of storage controllers, in accordance with a preferred embodiment of the present invention. As shown, an apparatus 200 includes an Owner 202, a Client 204, a portion of metadata 206 relating to data 208 held under the control of the network of storage controllers, and a copy 209 of data 208. Apparatus 200 also includes an ownership assignment component 210 to assign ownership of metadata to Owner 202, and a lock management component 212 operable to control locking at metadata 206 level during an I/O activity to ensure coherency with any data image 209, which may be a Flash Copy image, a Remote Copy image, or a Virtualized Storage image. In addition, apparatus 200 includes a messaging component 214 attached to Owner 202 and to Client 204. Messaging component 214 is operable to pass one or more messages between Client 204 and Owner 202 to request a response regarding a metadata state, grant a lock, request release of a lock, and signal that a lock has been released. Client 204 is operable to perform I/O on data whose metadata is owned by any Owner 202, subject to Client 204's compliance with the lock protocols at the metadata level controlled by Owner 202.

Different storage controllers are allocated the role of being metadata owners for different regions of storage. This ensures that a single owner storage controller does not itself become a bottleneck in the memory storage system.

As has been described, the present invention provides an improved method and apparatus for providing storage control in a network of storage controllers.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A computer program product residing on a computer recordable medium for providing control on metadata within a network of storage controllers, wherein said computer program product comprising:

program code means for designating one of said storage controllers as an owner storage controller, wherein said owner storage controller owns metadata controlling all input/output (I/O) operations associated with a region of storage;

program code means for designating remaining of said storage controllers as client storage controllers;

in response to an I/O request to one of said client storage controllers, program code means for suspending said I/O request by said one client storage controller;

program code means for determining, by said owner storage controller, whether or not said region of storage has already been copied;

program code means for, in a determination that said region of storage has been copied, unpending said I/O request by said one client storage controller to process said I/O request; and in a determination that said region of storage has not been copied, program code means for placing a lock record against said metadata associated with said region of storage;

program code means for copying data within said region of storage by said owner storage controller; and program code means for releasing said lock record to process said I/O request.

2. The computer program product of claim 1, wherein said program code means for copying further includes program code means for performing a copy-on-write operation.

3. The computer program product of claim 2, wherein said program code means for copying further includes program code means for marking in said metadata the region affected as having been copied.

4. The computer program product of claim 1, wherein said program code means for copying is a Flash Copy algorithm.

* * * * *